United States Patent
Paczkowski et al.

(10) Patent No.: US 8,984,592 B1
(45) Date of Patent: Mar. 17, 2015

(54) ENABLEMENT OF A TRUSTED SECURITY ZONE AUTHENTICATION FOR REMOTE MOBILE DEVICE MANAGEMENT SYSTEMS AND METHODS

(71) Applicant: Sprint Communications Company L.P., Overland Park, KS (US)

(72) Inventors: Lyle W. Paczkowski, Mission Hills, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/844,357

(22) Filed: Mar. 15, 2013

(51) Int. Cl.
*H04L 29/06* (2006.01)
*H04W 12/08* (2009.01)

(52) U.S. Cl.
CPC .................... *H04W 12/08* (2013.01)
USPC ................................ 726/4; 726/26

(58) Field of Classification Search
USPC .................................. 726/3, 4, 26
See application file for complete search history.

(56) References Cited

U.S. PATENT DOCUMENTS

| | | | |
|---|---|---|---|
| 5,303,378 A | 4/1994 | Cohen | |
| 6,131,024 A | 10/2000 | Boltz | |
| 6,219,712 B1 | 4/2001 | Mann et al. | |
| 6,668,322 B1 | 12/2003 | Wood et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,387,240 B2 | 6/2008 | Ziegler | |
| 7,552,467 B2 | 6/2009 | Lindsay | |
| 7,650,645 B1 | 1/2010 | Langendorf et al. | |
| 7,873,837 B1 | 1/2011 | Lee et al. | |
| 7,895,642 B1 | 2/2011 | Larson et al. | |
| 7,921,303 B2 | 4/2011 | Mauro, II | |
| 8,060,449 B1 | 11/2011 | Zhu | |

(Continued)

FOREIGN PATENT DOCUMENTS

| | | |
|---|---|---|
| WO | WO2011025433 A1 | 3/2011 |
| WO | 2013170228 A2 | 11/2013 |

(Continued)

OTHER PUBLICATIONS

Notice of Allowance dated May 27, 2014, U.S. Appl. No. 13/482,731, filed May 29, 2012.

(Continued)

*Primary Examiner* — Joseph P Hirl
*Assistant Examiner* — John B King

(57) ABSTRACT

A method of accessing secure data on a mobile device is disclosed. The method comprises receiving a request to access a data package stored on the mobile device. The method comprises authorizing the request to access the data package, wherein authorizing comprises querying the request to obtain one or more request identifications. The method comprises granting a key in response to authorizing the request, wherein the key provides access to a secure environment storing one or more flags associated with the data package. The method comprises granting access to the secure environment, wherein access is granted to the secure environment in response to presenting the key to the secure environment. The method comprises granting access to the data package, wherein granting access to the data packages comprises setting the one or more flags associated with the data package.

20 Claims, 8 Drawing Sheets

(56) References Cited

U.S. PATENT DOCUMENTS

| | | |
|---|---|---|
| 8,073,428 B2 | 12/2011 | Khetawat et al. |
| 8,204,480 B1 | 6/2012 | Lindteigen et al. |
| 8,238,823 B2 | 8/2012 | Maugars et al. |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,793,808 B2 | 7/2014 | Boccon-Gibod |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0126225 A1 | 7/2003 | Camble et al. |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0052994 A1 | 3/2005 | Lee |
| 2005/0091505 A1 | 4/2005 | Riley et al. |
| 2005/0138433 A1 | 6/2005 | Linetsky |
| 2005/0235166 A1 | 10/2005 | England et al. |
| 2005/0239481 A1 | 10/2005 | Seligmann |
| 2005/0289355 A1 | 12/2005 | Kitariev et al. |
| 2006/0036851 A1 | 2/2006 | DeTreville |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdznski |
| 2007/0162759 A1 | 7/2007 | Buskey et al. |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0212503 A1 | 9/2008 | Lipford et al. |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0089449 A1 | 4/2009 | Day |
| 2009/0113425 A1 | 4/2009 | Ports et al. |
| 2009/0147958 A1 | 6/2009 | Calcaterra et al. |
| 2009/0154348 A1 | 6/2009 | Newman |
| 2009/0182634 A1 | 7/2009 | Park et al. |
| 2009/0193491 A1 | 7/2009 | Rao |
| 2009/0271321 A1 | 10/2009 | Stafford |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0198943 A1 | 8/2010 | Harrang et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0281139 A1 | 11/2010 | Deprun |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Florek et al. |
| 2011/0113479 A1 | 5/2011 | Ganem |
| 2011/0154032 A1 | 6/2011 | Mauro, II |
| 2011/0166883 A1 | 7/2011 | Palmer et al. |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0258462 A1 | 10/2011 | Robertson et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |

(56) References Cited

U.S. PATENT DOCUMENTS

| | | |
|---|---|---|
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137119 A1 | 5/2012 | Doerr et al. |
| 2012/0143703 A1 | 6/2012 | Wall et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Burdnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0212704 A1 | 8/2013 | Shablygin et al. |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0345530 A1* | 12/2013 | McRoberts et al. .......... 600/323 |
| 2013/0347103 A1 | 12/2013 | Veteikis et al. |
| 2014/0033316 A1* | 1/2014 | Paczkowski et al. ............ 726/26 |
| 2014/0047548 A1 | 2/2014 | Bye et al. |
| 2014/0074508 A1 | 3/2014 | Ying et al. |
| 2014/0188738 A1 | 7/2014 | Huxham |
| 2014/0245444 A1 | 8/2014 | Lutas et al. |
| 2014/0281544 A1 | 9/2014 | Paczkowski et al. |

FOREIGN PATENT DOCUMENTS

| | | | |
|---|---|---|---|
| WO | 2014004590 | A2 | 1/2014 |
| WO | 2014018575 | A2 | 1/2014 |
| WO | 2014025687 | A2 | 2/2014 |
| WO | WO2014158431 | A1 | 10/2014 |

OTHER PUBLICATIONS

Advisory Action dated May 29, 2014, U.S. Appl. No. 13/470,203, filed May 11, 2012.

FAIPP Pre-Interview Communication dated May 12, U.S. Appl. No. 13/294,177, filed Nov. 11, 2011.

Final Office Action dated Apr. 10, 2014, U.S. Appl. No. 13/571,348, filed Aug. 10, 2012.

FAIPP Pre-Interview Communication dated Apr. 3, 2014, U.S. Appl. No. 13/802,383, filed Mar. 13, 2013.

First Action Interview Office Action dated May 23, 2014, U.S. Appl. No. 13/802,383, filed Mar. 13, 2013.

Foreign Communication from a Related Counterpart—International Search Report and Written Opinion, dated Apr. 22, 2014, PCT/US13/53617, filed on Aug. 5, 2013.

Notice of Allowance dated Nov. 29, 2013, U.S. Appl. No. 13/440,980, filed Apr. 5, 2012.

Office Action dated Dec. 19, 2013, U.S. Appl. No. 13/557,213, filed Jul. 25, 2012.

FAIPP Pre-Interview Communication dated Nov. 27, 2013, U.S. Appl. No. 13/610,856, filed Sep. 11, 2012.

Notice of Allowance date Jan. 31, 2014, U.S. Appl. No. 13/610,856, filed Sep. 11, 2012.

Cope, Warren B., et al., "Extended Trusted Security Zone Radio Modem", filed Nov. 26, 2013, U.S. Appl. No. 14/090,667.

Paczkowski, Lyle W., et al., "Trusted Security Zone Containers for the Protection and Confidentiality of Trusted Service Manager Data", filed Feb. 16, 2014, PCT Application No. PCT/US14/16651.

Foreign Communication from a Related Counterpart—International Search Report and Written Opinion, dated Dec. 2, 2013, PCT/US13/40673, filed on May 10, 2013.

Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.

Foreign Communication from a Related Counterpart—International Search Report and Written Opinion, dated Feb. 4, 2014, PCT/US13/47729, filed on Jun. 25, 2013.

Foreign Communication from a Related Counterpart—International Search Report and Written Opinion, dated Feb. 4, 2014, PCT/US13/51750, filed on Jul. 24, 2013.

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

(56) References Cited

OTHER PUBLICATIONS

Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
Mcroberts, Leo Michael, et al., "End-to-End Trusted Communications Infrastructure", filed Jun. 25, 2012, U.S. Appl. No. 13/532,588.
Mcroberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213 filed Jul. 25, 2012.
Notice of Allowance dated Oct. 16, 2013, U.S. Appl. No. 13/556,200, filed Jul. 24, 2012.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.

(56) References Cited

OTHER PUBLICATIONS

Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E, Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Ahmed, Farid, et al., "Correlation-based Watermarking Method for Imagine Authentication Applications", Society of Photo-Optical Instrumentation Engineers, Feb. 17, 2004, pp. 1834-1838.
Office Action dated Aug. 29, 2014, U.S. Appl. No. 13/470,203, filed on May 11, 2012.
Notice of Allowance dated Oct. 8, 2014, U.S. Appl. No. 13/294,177, filed on Nov. 11, 2011.
FAIPP Pre-Interview Communication dated Sep. 25, 2014, U.S. Appl. No. 13/533,969, filed on Jun. 27, 2012.
FAIPP Pre-Interview Communication dated Nov. 12, 2014, U.S. Appl. No. 13/844,145, filed on Mar. 15, 2013.
Notice of Allowance dated Sep. 19, 2014, U.S. Appl. No. 13/594,778, filed on Aug. 25, 2012.
Final Office Action dated Nov. 7, 2014, U.S. Appl. No. 13/786,450, filed on Mar. 5, 2013.
Notice of Allowance dated Sep. 26, 2014, U.S. Appl. No. 13/831,486, filed on Mar. 14, 2013.
FAIPP Pre-Interview Communication dated Nov. 7, 2014, U.S. Appl. No. 13/802,404, filed on Mar. 13, 2013.
FAIPP Pre-Interview Communication dated Oct. 29, 2014, U.S. Appl. No. 13/844,282, filed on Mar. 15, 2013.
FAIPP Pre-Interview Communication dated Oct. 21, 2014, U.S. Appl. No. 13/844,325, filed on Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.

\* cited by examiner

ENABLEMENT OF A TRUSTED SECURITY ZONE AUTHENTICATION FOR REMOTE MOBILE DEVICE MANAGEMENT SYSTEMS AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information. Applications are sometimes uploaded to computing platforms and/or communication devices from sources that make no warranty of the integrity of the applications. For example, sometimes individual application developers may upload an application that they offer for free or for a purchase price to the source, such as an application repository. These applications may be deliberately or unknowingly infected with malware. When one of these applications is downloaded to a computing platform and/or a mobile communication device, the computing platform and/or the mobile communication device may have a negative experience because of malware carried in the downloaded application.

SUMMARY

A method of accessing secure data on a mobile device is disclosed. The method comprises receiving a request to access a data package stored on the mobile device. The method further comprises authorizing the request to access the data package, wherein authorizing comprises querying the request to obtain one or more request identifications. The method also comprises granting a key in response to authorizing the request, wherein the key provides access to a secure environment storing one or more flags associated with the data package, wherein the secure environment prevents unauthorized access to the one or more flags, wherein the secure environment comprises a trusted security zone or a secure element, wherein the trusted security zone comprise one or more chipsets with a hardware root of trust, a secure execution environment for applications, and secure access to peripherals, and wherein the secure element comprises a secure operating environment comprising a microprocessor, memory, and operating system. The method comprises granting access to the secure environment, wherein access is granted to the secure environment in response to presenting the key to the secure environment. The method further comprises granting access to the data package, wherein granting access to the data packages comprises setting the one or more flags associated with the data package.

A method of securing data on a mobile device is disclosed. The method comprises enabling a user to secure one or more data packages from wireless access, wherein securing one or more data packages comprises setting one or more data package flags associated with the one or more data packages using a mobile device interface, wherein at least the one or more data package flags are stored in a secure environment on the mobile device, wherein the secure environment prevents unauthorized access to the one or more flags, wherein the secure environment comprises a trusted security zone or a secure element, wherein the trusted security zone comprise one or more chipsets with a hardware root of trust, a secure execution environment for applications, and secure access to peripherals, and wherein the secure element comprises a secure operating environment comprising a microprocessor, memory, and operating system. The method further comprises receiving a wireless request to access the one or more data packages. The method also comprises querying the wireless request to access the one or more data packages, wherein querying comprises requesting one or more wireless request identifications. The method comprises denying access to the one or more data packages based on querying the wireless request to access the one or more data packages, wherein denying access to the one or more data packages comprises denying access to the secure environment storing at least the one or more data package flags.

A method of installing secure data on a mobile device is disclosed. The method comprises receiving a request to install one or more data package flags in a secure environment on the mobile device, wherein the one or more data package flags are associated with one or more data packages, wherein the secure environment prevents unauthorized access to the one or more flags, wherein the secure environment comprises a trusted security zone or a secure element, wherein the trusted security zone comprise one or more chipsets with a hardware root of trust, a secure execution environment for applications, and secure access to peripherals, and wherein the secure element comprises a secure operating environment comprising a microprocessor, memory, and operating system. The method further comprises authorizing the request to install the one or more data package flags in the secure environment, wherein authorizing comprises querying the request to obtain one or more request identifications. The method also comprises granting a key based on the authorization of the request to install the one or more data package flags in the secure environment, wherein the key provides access to install one or more data package flags in the secure environment. The method comprises storing one or more installed data package flags in the secure environment through the use of the key, wherein storing the one or more installed data package flags secured one or more associated data packages on the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
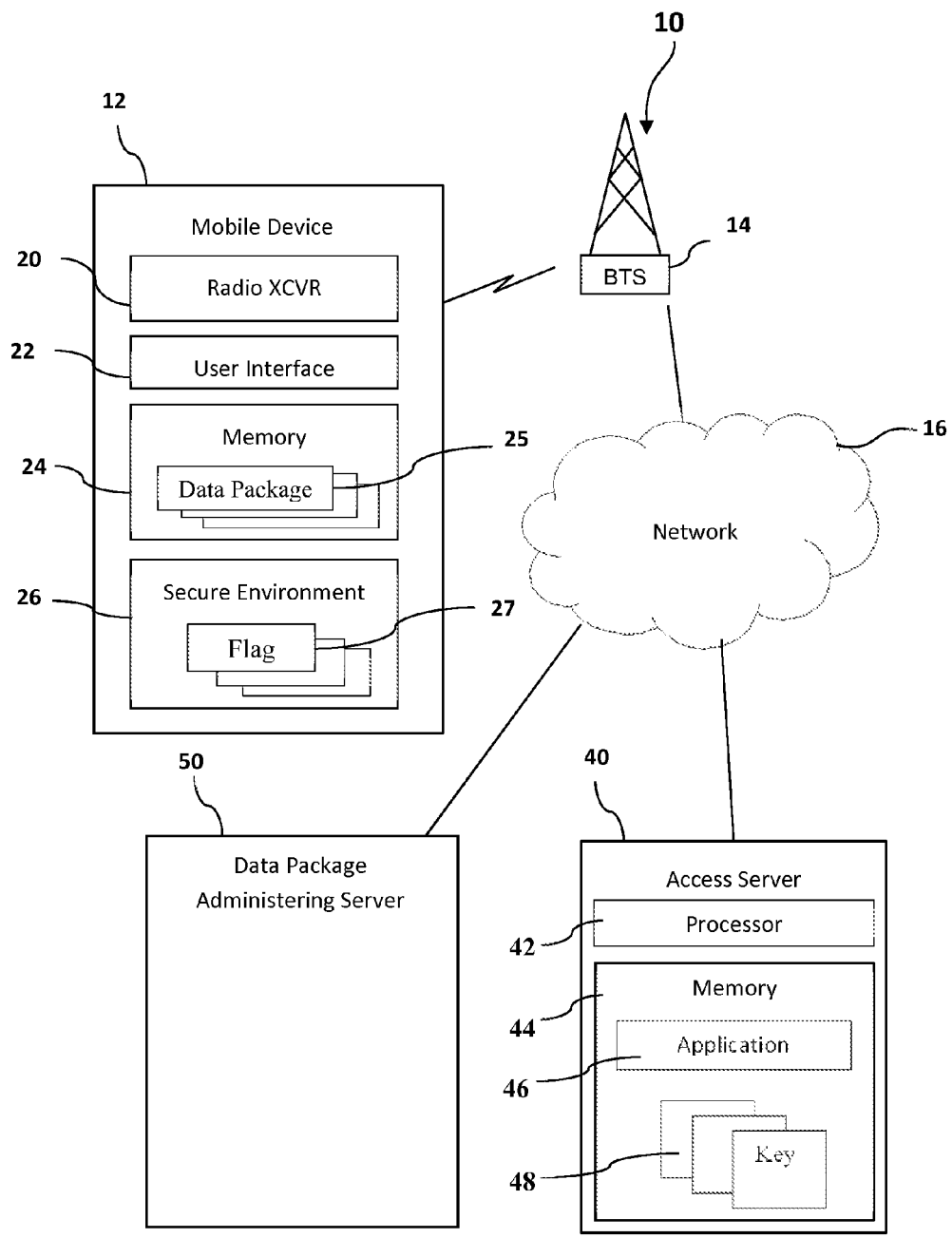
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Systems and methods are taught herein that may be used to secure mobile device management software, applications managed by mobile device management software, and/or one or more persona of a mobile device. In an embodiment, the systems and methods taught herein may be used to secure any application such as a mobile device management application stored at the layer 7 level of a mobile device. In an embodiment, a layer 7 level may comprise an application layer of a plurality of abstraction layers of a mobile device utilizing the Open System Interconnection (OSI) model or other communication layered model (e.g., TCP/IP stack model) as known in the art.

Generally, the systems and methods disclosed allow a mobile device user to remotely access, control, and/or protect particular applications and/or persona on a mobile device, for example, if the mobile device has been lost. For example, a mobile device comprising the systems disclosed herein may be left by the mobile device owner in a coffee shop. The owner of the mobile device may not have realized that their mobile was left in the coffee shop until hours later. The mobile device may comprise a business persona with confidential information and/or applications concerning their business stored on the mobile device. The confidential information and/or applications associated with the business persona may be backed-up by a server at the business location and thus easily re-obtained if deleted. Additionally, the mobile device may comprise a personal persona with a list of personal contacts and a personal email account, neither of which are backed-up by a server and/or other back-up storage devices and difficult to replace if deleted. Thus, when the mobile device user realizes that the mobile device was left at the coffee shop, the mobile device user may access remotely and set one or more flags associated with the personal persona and/or may have previously accessed and set the one or more flags associated with the personal persona and implement a remote wipe (i.e. a deletion of all unprotected and/or accessible data on the mobile device) deleting the applications and/or confidential information associated with the business persona without the deleting the information associated with the personal persona. Using the system disclosed, the mobile device user may prevent a nefarious entity from accessing the confidential information before the user gets back to the coffee shop to retrieve their mobile device. Additionally, if the mobile device user does recover their mobile device, the user retains all the data associated with the personal persona. Furthermore, even though the personal persona is protected because the flags have been set, authorized entities (i.e. non-nefarious entities) may access one or more data packages associated with the persona persona by providing credentials to obtain authorization.

This may be accomplished by creating a secure environment on a mobile device. The secure environment may protect data, instructions, and/or flags associated with data stored in an unsecured memory environment and/or data stored in the secured environment on the mobile device. Flags stored in the secure environment may be "set" so that a server such as a data package administering server may access, manipulate, update, delete, and/or the like, one or more data packages associated with the one or more "set" flags. In an embodiment, data packages may comprise one or more bits of data utilized for example by an application, logic instructions for an application such as a device management application, and/or the like.

A data package administering server may desire to install, for example, an update to one or more data packages stored in the memory of a mobile device. The data package administering server and/or an entity associated with the data package administering server may have been given one or more request identification such as security codes to access data packages stored in the memory of the mobile device. The data package administering server may have also given a network administrator additional information which may be used to create a login account. For example, the data package administering server may have informed a network administrator of the types of access, such as updating, installing, deleting, and/or the like, that a data package administrator would desire to carry out in a secure environment on the mobile device as well as which data files it would store in the secure environment on the mobile device. The network administrator may create a login account for that particular data package administering server and store the login account in the memory of an access server for example. Thus, when the data package administering server sends a request to access a data package stored on the mobile device, the access server and/or the mobile device may receive the request and attempt to authorize the request. The access server and/or the mobile device may authorize the request by querying the request to obtain one or more request identifications. The access server and/or the mobile device may access a look-up table with one or more login accounts. The access server may compare the request identification with the login accounts to find a match.

If a match is found, the access server may grant one or more keys to the data package administering server who sent the request to access a data package. The one or more keys may provide access to a secure environment on one or more mobile devices, the secure environment may store one or more flags which may provide access to one or more data packages stored on one or more of the mobile devices. The mobile device(s) and/or the access server may grant access to the secure environment in response to the data package administering server presenting the key(s) to the secure environment. In an embodiment, the key may be configured to expire after a predetermined time and/or a predetermined number of access attempts. In an embodiment, the access server may configure the secure environment so that key(s) allow access to the secure environment for a predetermined period of time and/or a predetermined number of access attempts. Once a data package administering server accesses the secure environment, the data package administering server may "set" and/or "unset" one or more flags to access one or more data packages.

It should be understood that depending on the application, a user preference, a service provider preference, and/or a data package administering servicer preference, one or more flags 27 may initially be "set" allowing access to one or more associated data packages, for example. Thus, "unsetting" the flags 27 may prevent access to one or more associated data packages. Alternatively, one or more flag 27 may initially be "unset" preventing access to one or more associated data packages, for example. Thus, "setting" the flags 27 may allow access to one or more associated data packages. Furthermore, depending on the application, a user preference, a service provider preference, and/or a data package administering servicer preference, one or more flag 27 may initially be "set" preventing access to one or more associated data packages, for example. Thus, "unsetting" the flags 27 may allow access to one or more associated data packages. Alternatively, one or more flags 27 may initially be "unset" allowing access to one or more associated data packages, for example. Thus, "setting" the flags 27 may prevent access to one or more associated data packages.

Similar embodiments may be used to install data packages in the secure environment of the mobile device. Additionally, the display on the mobile device may provide a window listing one or more applications which may be protected by "setting" and/or "unsetting" one or more flags in the secure environment. The window may be displayed in response to installing one or more applications and/or updating one or more applications. The window may also be provided by selecting an icon on the display of the mobile device. The user of the mobile device may then select which data packages the user wants protected. This feature may allow a mobile device user to protect certain content stored on the mobile device while allowing other content to be remotely deleted, for example, in the event that a mobile device is lost and/or stolen.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

A secure element (SE) comprises a tamper-resistant hardware platform (typically a one chip secure microcontroller) capable of securely hosting applications and their confidential and cryptographic data (e.g. key management) in accordance with one or more rules and/or security requirements. The one or more rules and/or security requirements may be set forth by a set of one or more well-identified trusted authorities, such as a mobile service provider, a credit card provider, a third party manager/managing system, a mobile device user, and/or the like. In an embodiment, multiple secure elements may be linked together so that one or more related applications stored in different secure elements may communicate between each other. Secure element may be implemented with mobile devices, personal computers, mobile electronics, and/or the like. Secure element may utilize at least one of three different form factors: Universal Integrated Circuit Card (UICC), embedded secure element, and microSD. The UICC and microSD may comprise removable form factors from, for example, a handset and/or mobile device. The utilization of different form factors, for example, may link applications utilizing secure element to different business implementations and/or satisfy different market needs.

Generally, secure element may provide a secure operating environment for financial transactions, transit ticketing, identification and authentication, physical security access, and other functions through near field communication (NFC). A secure element generally includes its own operating environment with a tamper-proof microprocessor, memory, and operating system. For example, a trusted service manager among other things, installs, provisions, and personalizes the secure element. The secure element may have one or more access keys that are typically installed at manufacture time. A corresponding key may be shared by the trusted service manager so that the TSM can establish a cryptographically secure channel to the secure element for installation, provisioning, and personalization of the secure element while the device having the secure element is in the possession of an end user. In this way, the secure element can remain secure even if the host CPU in the device has been compromised.

Turning now to FIG. 1, a communication system 10 is described. In an embodiment, the system 10 may comprise a mobile device 12, a base transceiver station (BTS) 14, a network 16, an access server 40, and a data package administering server 50. The base transceiver station 14, the access server 40, and the data package administering server 50 may be communicatively coupled to the network 16. The base transceiver station 14 may provide a wireless communication link to couple the mobile device 12 to the network 16. While a single base transceiver station 14 is shown in FIG. 1, it is understood that the system 10 may comprise any number of base transceiver stations 14 and any number of mobile devices 12. The access server 40 may be a computer system. Computer systems are described further hereinafter. The data package administering server 50 may store one or more data packages, data package updates, and/or data instructions configured for one or more data packages 25 on one or more mobile devices 12. Although the embodiment illustrated in FIG. 1 depicts a data package administering server 50, a plurality of server types, such as a mobile device management server, may be alternatively and/or additionally implemented with the system 10. In an embodiment, the data package administering servers 50 may be the source of one or more data packages 25 (i.e. the server of origination of one or more data packages 25). In an embodiment, data packages 25 may comprise data for one or more applications, data for one or more mobile device management systems, logic instructions, and/or the like.

The mobile device 12 may comprise a mobile phone, a personal digital assistant, a media player, a radio frequency wireless enabled laptop computer, a radio frequency wireless enabled notebook computer, a wireless enabled tablet computer, or other electronic device enabled to conduct mobile radio frequency communication. In an embodiment, the mobile device 12 may be implemented as a handset. Details of handsets are discussed further hereinafter. The base transceiver station 14 provides a communication link to the mobile device 12 and couples the mobile device 12 to the network 16. In an embodiment, the base transceiver station 14 may provide wireless communication links to the mobile device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. The network 16 may be a public communication network, a private communication network, or a combination thereof.

In an embodiment, the mobile device 12 comprises a radio transceiver 20, a user interface 22, a memory 24, and a secure environment 26. The radio transceiver 20 may collaborate with the base transceiver station 14 to establish a wireless communication link between the mobile device 12 and the base transceiver station 14. The memory 24 may comprise a plurality of data packages 25. For example, the data packages 25 may comprise a mobile device operating system, one or more applications, one or more data processing instructions, and/or the like. In an embodiment, the data packages 25 may be accessed, manipulated, updated, deleted, and/or the like only by setting one or more flags 27 as will be disclosed further herein.

The radio transceiver 20 is configured to establish a wireless communication link with the base transceiver station 14. The base transceiver station 14 may communicatively couple the radio transceiver 20 and/or the mobile device 12 to the network 16 and to devices that are connected to the network 16, for example the access server 40. In an embodiment, the radio transceiver 20 and the base transceiver station 14 establish a wireless communication link according to one of a code division multiple access (CDMA) wireless protocol, a global system for mobile communication (GSM) wireless protocol, a long term evolution (LTE) wireless protocol, a worldwide interoperability for microwave access (WiMAX) wireless protocol, or another wireless communication protocol.

The user interface 22 of the mobile device 12 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, or phone call audio) to a user of the mobile device 12. The microphone may receive voice and/or audio from a user and/or communicate audio to a user. In an embodiment, a user may utilize the user interface 22 to communicate with the mobile device 12, for example, to initiate the execution of a device application and/or a secure application. Additionally, a user may receive communication from the mobile device 12 via the user interface 22, such as messages, emails, contact information, caller identification, call history, internet access, etc. A user may additionally employ the user interface 22 for viewing and/or listening to media such as music, movies, shows, videos, photos, games etc.

The mobile device 12 may also comprise a secure environment 26. In an embodiment, the secure environment 26 may comprise secure element zone, a trusted security zone, and/or the like. The secure environment 26 may be accessed only with a particular key 48 configured to provide access into the secure environment 26. The secure environment 26 may also store one or more flags 27. The flags 27 may be manipulated, for example "set", so that "setting" the flag 27 may allow a server, such as the data package administering server 50, to access, manipulate, update, delete, and/or the like one or more data packages 25 on the memory 24 of the mobile device 12. In an embodiment, "setting" may comprise preventing access to one or more data packages, so that by "unsetting" one or more flags 27, access may be obtained to one or more data packages and/or one or more persona.

In an embodiment, the flags 27 may be configured to provide access to a particular data package 25 stored in the memory 24 of the mobile device 12. For example, the data package administering server 50 may desire to access a particular data package 25 on the memory 24 of the mobile device 12 in order to update the operating system of the mobile device 12. The data package administering server 50 may gain access to one or more flags 27 associated with one or more data packages of the data package administering server 50. The data package administering server 50 may set one or more of the flags 27 to access the one or more packages. While FIG. 1 depicts that data packages 25 are stored in memory 24, in an embodiment, data packages 25 may be additionally and/or alternatively stored in the secure environment 26.

In an embodiment, an application administrator may desire to install a new version of a mobile device application on the mobile device 12. The application administrator may desire to restrict access to the mobile device application because the mobile device application may be, for example, populated with confidential information. The application administrator may install one or more flags 27 in the secure environment 26 to protect the data package associated with the mobile device application from access or manipulation by nefarious entities.

In an embodiment, the flags 27 may be configured to provide access to a particular set of data packages 25 stored in the memory 24 of the mobile device 12. For example, a particular set of data packages 25 may be associated with a particular persona. In an embodiment, a persona may comprise a group of one or more applications associated with one or more categories. The persona may define rules for accessing data and/or may provide authorization for accessing data. For example, a mobile device 12 may have a business persona which comprises one or more applications associated with the mobile device user's employment and/or business ventures. Alternatively or additionally, the mobile device 12 may have a financial persona which comprises one or more applications associated with the mobile device user's bank accounts, credit cards, and/or investments. Alternatively or additionally, the mobile device 12 may comprise a personal persona which comprises a personal email account and contact list which stores the names, phone numbers, and addresses of the mobile device user's family and friends. In an embodiment, one or more applications may be associated with one or more persona, for example a business persona and a personal persona.

As an example, the mobile device 12 may comprise at least two persona, for example, a business persona and a personal persona. The owner of the mobile device 12 may have misplaced his mobile device 12 while at a coffee shop. The business persona may have highly confidential information such as trade secret information and/or company data security codes stored which may be easily repopulated within the mobile device 12 if found, but dangerous and/or detrimental in the wrong hands. Conversely, the personal persona may comprise addresses and phone numbers of friends and family members which have little or no confidential information, but may be more difficult to repopulate. Thus, if the owner of the mobile device 12 desires to delete the business persona to protect the confidential information but does not desire to delete the personal person, the owner of the mobile device 12 may be able to remotely set (e.g. via a secured webpage and/or by calling a customer care representative of a mobile service provider and providing one or more security codes) the one or more flags associated only with the personal persona. By setting only the one or more flags associated with the personal persona, one or more data packages associated with the personal persona may for example be protected during, for example, a remote wipe, such that all the data packages which has flags 27 which were not set, and thus unprotected, such as the data packages associated with the business persona, may be deleted by the remote wipe without also deleting the data packages associated with the personal persona. It should be understood that a "remote wipe" comprises remotely deleting and/or wiping out all unprotected and/or accessible data packages (e.g. data packages associated with applications) and/or data instructions. In this example, if a nefarious entity finds the mobile device 12, the nefarious entity may not be able to obtain the confidential information of the business persona. However, if the mobile device 12 is found by the owner, the owner will not have lost his personal information stored in the personal persona. The owner of the mobile device 12 may then be able to repopulate the confidential data associated with the business persona later at his company facility, for example.

The access server 40 may comprise a processor 42, a memory 44, an application 46, and a plurality of keys 48 stored in the memory 44. The access server 40 may also comprise a plurality of processors 42 located in a plurality of computers. Computers are discussed in more detail hereinafter. The application 46, when executed by the processor 42 of the access server 40, may receive a request message from, for example a mobile device 12 and/or data package administering server 50, to obtain a key 48 providing access to the secure environment 26 and/or a particular set of one or more flags 27 on the secure environment 26. In response to the request message, the application 46 may identify at least one key 48 stored in the memory 44 of the access server 40, for example a key associated with a particular flag and/or a key associated with the secure environment 26 of the mobile device 12.

Figure 2:
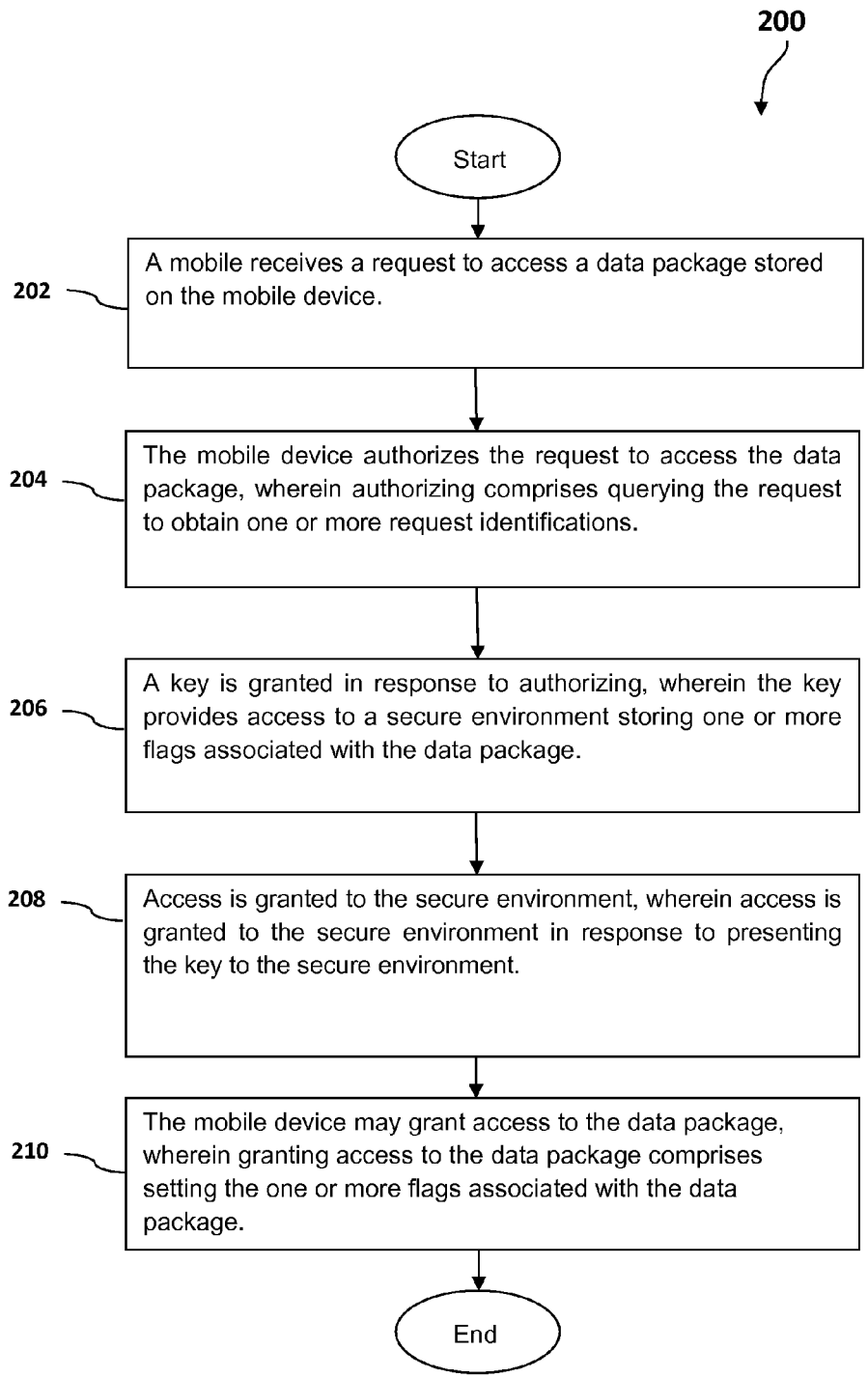
FIG. 2 is a flow chart of a method according to an embodiment of the disclosure.

Turning now to FIG. 2, a method 200 is described. At block 202, a mobile device 12 and/or the access server 40 receives a request to access a data package 25 stored on one or more mobile devices 12. In an embodiment, the data package 25 may be associated with one or more applications, one or more mobile device management applications, and/or a particular persona of two more personas. For example, a data package administering server 50 may desire access to a data package 25 stored in the memory 24 of the mobile device 12. The data package 25 may have been provided by the data package administering server 50 and/or a data package management server administrator. The data package administering server 50 may have a data package update to install with the data package 25 that the data package administering server 50 desires to access. The mobile device 12 may receive a request from the data package administering server 50 identifying, for example, which set of one or more data packages 25 the data package administering server 50 desires to access, how much additional memory an update will consume on the mobile device 12, the identity of the data package administering server 50, which action or actions the data package administering server 50 desires to take, the IP address of the set of one or more mobile device 12 the data package administration server 50 desires to access, and/or one or more access codes verifying that the data package administering server 50 is a trusted server. In an embodiment, the term "access" and/or "accessed" may be construed to comprise the following actions: accessed, viewed, manipulated, updated, modified, deleted, and/or the like. Thus, if the data package administering server 50 sends a request to a mobile device to "access" one or more data packages 25 stored on the mobile device 12, "access" may comprise one or more of the above interpretations. In an embodiment, the access server 40 may receive the request to access a data package 25 stored on the mobile device 12.

At block 204, the mobile device 12 and/or the access server 40 authorizes the request to access the data package 25, wherein authorizing comprises querying the request to obtain one or more request identifications. For example, upon receiving a request to access one or more data packages 25 stored on the mobile device 12, the mobile device may query the data package administering server 50 to provide one or more security codes as well as identify which actions the data package administering server 50 purports to take with one or more data packages 25. The data package administering server 50 may transmit the request identifications to the mobile device 12 for verification. In an embodiment, the data package administering server 50 may provide request identification used by the mobile device 12 to verify the authentication of the data package administering server 50 in the request to access a data package 25. The mobile device 12 may access a look-up table to verify that the one or more security codes matches one or more codes in an approved list of security codes or to verify that the one or more codes provided are associated with a particular trusted data package administering server 50. It should be understood that a "trusted" data package administering server 50 may be a data package administering server 50 that is approved and/or authorized by, for example a mobile service provider, to access one or more data packages 25 stored in the memory 24 of the mobile device 12. Thus, for example, by matching a security code provided in an access request with a security code in a look-up table that is associated with an approved and/or authenticated data package administering server 50, the data package administering server 50 may be considered a "trusted" data package administering server 50.

In an embodiment, the mobile device 12 and/or the access server 40 may also examine how much additional memory an update and/or an installation of an access request purports to consume on the memory 24 of the mobile device 12. For example, the mobile device 12 may access a look-up table which matches a security code provided in response to identification request with a security code in the look-up table associated with a trusted data package administering server 50. The look-up table may also indicate that the data package administering server 50 that provides a particular security code is allocated fixed amount of memory space on the memory 24 of the mobile device 12, for example for this particular access attempt. Thus, if the access request or the request identification provides a different memory requirement than what is indicated in the look-up table, then the data package administering server 50 may not be provided access to one or more data packages 25. In an embodiment the look-up tables may be located on the mobile device 12 and/or on the access server 40. Additionally, in an embodiment, the access server 40 may query the request to receive access to a data package 25 stored on the mobile device 12.

In an embodiment, the mobile device 12 and/or the access server 40 may also examine if the IP address the data package administering server 50 requests to access is an authorized IP address for that particular data package administering server 50. For example, through one or more means disclosed herein, the access request and/or in response to querying request identification(s), the mobile device 12 may examine if the data package administering server 50 is authorized to access the IP address of the mobile device 12 that the data package administering server 50 desires to access. Although the data package administering server 50 may be authorized to access the memory 24 of a first set of mobile devices 12, the data package administering server 50 may not be permitted to access the memory 24 of a different set of mobile devices 12. Thus, for example, by referring to a look-up table the mobile device 12 may determine if the data package administering server 50 is authorized to access particular IP address associated with mobile devices 12.

In an embodiment, the mobile device 12 and/or the access server 40 may examine the action the data package administering server 50 purports to take is an authorized action. For example, data package administering server 50 may be authorized to update data packages 25 on the memory 24 of the mobile device 12 and install additional data packages 25 on the memory 24 of the mobile device 12. However, the data package administering server 50 may not be authorized to delete data packages on the memory of a mobile device 12. Thus, if the data package administering server 50 provides an identification, for example to the mobile device 12 and/or the access server 40, to delete one or more data packages 25 stored on the memory 24 of the mobile device 12, the data package administering server 50 may be denied access to one or more data packages 25 on a particular mobile device 12. In an embodiment, by using for example, a look-up table, the mobile device 12 and/or the access server 40 may verify that the access request from a data package administering server 50 is authorized and comprise an approved request based on one or more request identifications given by a data package administering server 50.

At block 206, a key 48 is granted in response to authorizing the request, wherein the key 48 provides access to a secure environment 26 storing one or more flags 27 associated with the data package 25. For example, if the mobile device 12 and/or the access server 40 authorizes a data package administering server 50 to access one or more data packages 25 on the memory 24 of a set of one or more mobile devices 12, the access server 40 may provide one or more keys 48 stored, for example, in the memory 44, of the access server 40 to access a secure environment 26 on a set of one or more mobile devices 12. In an embodiment, when the mobile device 12 authorizes the request to access the data package 25, the mobile device 12 may transmit one or more signals to the access server 40 to configure one or more keys 48 for the data package administering server 50. In an embodiment, the secure environment 26 may store one or more flags 27 associated with one or more data packages 25 stored on the memory 24. For example, a first set of one or more flags 27 may be associated with a first set of one or more data packages 25 such that by "setting" the one or more flags 27 a data package administering server 50 may access one or more data package 25 associated with the set of one or more flags.

In an embodiment, one or more keys 48 granted in response to authorizing the request may provide access to only a set of one or more flags 27 stored in the secure environment 26. Thus, in this embodiment, an access server 40 may be able to protect a first set of one or more flags 27 from a data package administering server 50 that is not authorized to access a first set of one or more data packages 25 while providing access to a second set of one or more flags 27 and thus a second set of one or more data packages 25 that the data package administering server 50 is authorized to access. In an embodiment, the one or more keys 48 may provide access to the entire secure environment 26.

In an embodiment, the access server 40 may grant one or more keys 48 which expire after a time limit and/or a predetermined number of access attempts. In an embodiment, the access server 40 may generate a key 48 that limits the amount of time a data package administering server 50 may access a set of one or more data packages 25. For example, a key 48 may be granted to a data package administering server 50 that sets a fixed amount of time that a data package administering server 50 may access a set of one or more data packages 25. Thus, for example, the data package administering server 50 may use a key 48 to access the secure environment 26 to "set" one or more flags 27 associated with a set of one or more data packages 25. However, when the time on the key 48 expires, the one or more flags 27 may "unset" preventing the data package administering server 50 from accessing the set of one or more data packages and also preventing the data package administering server 50 from accessing the secure environment 26 again. Depending on the application, a user preference, a service provider preference, and/or a data package administering servicer preference, one or more flag 27 may initially be "set" allowing access to one or more associated data packages, for example. Thus, "unsetting" the flags 27 may prevent access to one or more associated data packages. Alternatively, one or more flag 27 may initially be "unset" preventing access to one or more associated data packages, for example. Thus, "setting" the flags 27 may allow access to one or more associated data packages. Furthermore, depending on the application, a user preference, a service provider preference, and/or a data package administering servicer preference, one or more flag 27 may initially be "set" preventing access to one or more associated data packages, for example. Thus, "unsetting" the flags 27 may allow access to one or more associated data packages. Alternatively, one or more flag 27 may initially be "unset" allowing access to one or more associated data packages, for example. Thus, "setting" the flags 27 may prevent access to one or more associated data packages. In an embodiment, the data package administering server 50 may have to send another request, for example to the mobile device 12 and/or the access server 40 to access the one or more data packages 25 on the memory 24.

In an embodiment, the time limit may comprise the time limit that a data package administering server 50 may have to access the secure environment 26. For example, an access server 40 may provide one or more keys 48 to a data package administering server 50 with a time limit, however, the data package administering server 50 does not use the one or more keys 48 until after the time expires. Thus, because the one or more keys 48 were not used, the data package administering server 50 may have to send another request, for example to the mobile device 12 and/or the access server 40 to access the one or more data packages 25 on the memory 24. Conversely, if the data package administering server 50 accesses the secure environment 26 with the one or more keys 48 before the time limit expires, the data package administering server 50 may continue to access one or more data packages 25 even after the time expires with the one or more keys 48 because the one or more flags 27 have already been "set." In an embodiment, the one or more flags 27 which were "set" by the data package administering server 50 may automatically "unset" when the data package administering server 50 no longer desires access to the memory 24 of the mobile device 12.

In an embodiment, the one or more keys 48 may expire after a predetermined number of access attempts. For example, the one or more flags 27 may not automatically "unset" when the data package administering server 50 no longer desires access to the memory 24 and/or one or more data packages 25 stored on the memory 24. The one or more keys 48 may expire after two access attempts. Thus, after the data package administering server 50 uses the one or more keys 48 a first time to "set" one or more flags 27, and the data package administering server 50 may use the one or more keys 48 a second time to "unset" the one or more flags 27, preventing further access to one or more data packages 25.

At block 208, access is granted to the secure environment 26, wherein access is granted to the secure environment 26 in response to presenting the key 48 to the secure environment 26. In an embodiment, access may be granted to a particular set of one or more flags 27 such that access is granted to only the particular set of one or more flags 27 by presenting the key 48 to the secure environment 26. For example, the access server 40 may generate one or more keys 48 providing access to the data package administering server 50. After generating the one or more keys 48, the access server 40 may transmit one or more signals to the secure environment 26 on the mobile device configuring the secure environment 26 with the generated one or more keys 48 so that the one or more keys 48 provide access to a particular set of one or more flags 27. In an embodiment, after generating the one or more keys 48, the access server 40 may transmit one or more signals to the secure environment 26 on the mobile device 12 configuring the secure environment 26 with the generated one or more keys 48 so that the one or more keys 48 provide access to the entire secure environment 26.

At block 210, the mobile device 12 and/or the access server 40 may grant access to the data package 25, wherein granting access to the data package 25 comprises setting the one or more flags 27 associated with the data package 25. In an embodiment, setting one or more flags 27 may allow the data package administering server 50 to access any of the data packages 25 stored in the memory 24 of the mobile device 12. In an embodiment, setting one or more flags 27 may allow the data package administering server 50 to access one or more specific data packages 25 stored in the memory 24 of the mobile device 12. In an embodiment, access to the one or more data packages comprises at least one of viewing content associated with the data package, manipulating content associated with the data package, modifying a data package, deleting a data package, and executing a data package.

Figure 3:
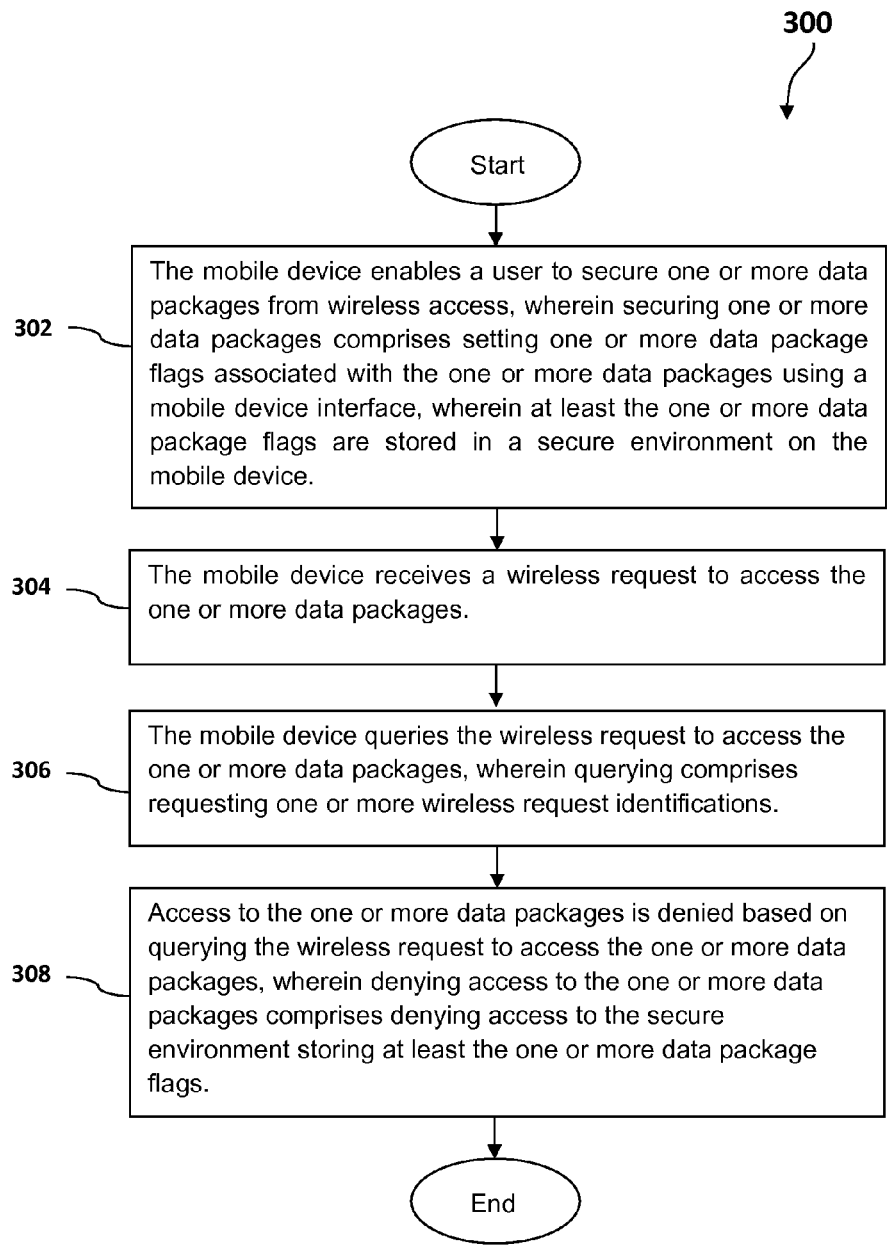
FIG. 3 is a flow chart of another method according to an embodiment of the disclosure.

Turning now to FIG. 3, a method 300 is described. At block 302, the mobile device 12 and/or the access server 40 enables a user to secure one or more data packages 25 from wireless access, wherein securing one or more data packages 25 comprises setting one or more data package flags 27 associated with the one or more data packages 25 using a mobile device interface 22, wherein at least the one or more data package flags 27 are stored in a secure environment 26 on the mobile device 12. For example, a user of the mobile device 12 may have one or more data packages 25 stored on the memory 24 of the mobile device 12 which the user wants protected from nefarious entities which may, for example, attempt to wirelessly hack into the mobile device 12 to obtain confidential information. The user may access via the interface 22 a menu allowing the user to set one or more flags 27 in the secure environment 26 associated with one or more data packages 25, whereby setting one or more flags 27 may prevent access to the one or more data packages 25. In an embodiment, the one or more flags 27 may be associated with a particular persona, for example, a business persona with confidential information. In an embodiment, one or more flags 27 may be associated with one or more data packages 25 maintained and/or developed via the data package administering server 50, for example, a mobile device management application maintained and/or developed via a mobile device management server. In an embodiment, one or more flags 27 may be associated with one or more data packages associated with a particular application, for example, an email application, contact list application, and/or the like.

In an embodiment, one or more data packages 25 may be secured (e.g. by "setting" flags 27 in the secure environment 26) automatically when the one or more data packages 25 are installed in the memory 24. In an embodiment, the user of the mobile device 12 may have to secure the one or more data packages manually after the data package(s) is installed on the mobile device 12. In an embodiment, when a mobile device 12 is powered on, the interface 22 may provide a window which notifies a user that one or more data packages, and/or one or more persona may be protected and/or secured. In an embodiment, the interface 22 may provide a window which notifies a user that one or more data packages and/or one or more persona may be protected when a data package and/or a persona are installed and/or updated on the mobile device 12. For example, a mobile device user may not be aware that a persona and/or one or more data packages may be protected from access by storing flags 27 associated with the persona and/or data package(s) 25 in the secure environment 26. Thus, when the mobile device user downloads an update, for example, to the mobile device 12, the interface 22 may provide a window indicating that the data being updated may be protected with a flag 27 stored on the secure environment 26. The mobile device user may select an option in the window or navigate to another window via the interface 22 and "set" one or more flags 27 in the secure environment 26 associated with the one or more data packages 25. In an embodiment, a password and/or number combination may be entered into the mobile device 12 by the user to "set" the one or more flags 27.

In an embodiment, the one or more flags 27 may be set remotely. For example, the user may access a secured webpage allowing the user to access the secure environment 26 to set one or more flags 27 associated with one or more data packages 25, whereby setting one or more flags 27 may prevent access to the one or more data packages 25. The user may also call a customer care representative of a mobile service provider, provide one or more security codes, and direct the customer care representative to set one or more flags 27. Thus, a user may set one or more flags 27 protecting one or more applications and/or one or more persona while leaving the remaining unprotected, so that for example, the user may subsequently implement a "remote wipe" function deleting confidential information within a mobile device 12 without deleting information that is not confidential and/or difficult to re-obtain.

At block 304, the mobile device 12 and/or the access server 40 may receive a wireless request to access the one or more data packages 25. At block 306, the mobile device 12 may query the wireless request to access the one or more data packages 25, wherein querying comprises requesting one or more wireless request identifications. At block 308, access to the one or more data packages 25 may be denied based on querying the wireless request to access the one or more data packages 25, wherein denying access to the one or more data packages 25 comprises denying access to the secure environment 26 storing at least the one or more data package flags 27. For example, a nefarious entity (e.g. a nefarious server and/or an unauthorized server) may attempt to access one or more data packages 25. The nefarious entity may desire to delete one or more data packages 25 on a plurality of mobile devices 12. The nefarious entity may make a request, for example, to each of the plurality of mobile devices 12 and/or the access server 40. The nefarious entity may provide request identifications such as at least one of a security code, an identification of the source of the request, an identification of the action the request purports to take, an identification of one or more data packages the request purports to access, and an identification of the IP address of the mobile device 12 sought by the request. However, one or more of the request identifications may not match one or more valid identifications stored in a look-up table. Thus, because one or more identifications do not match one or more valid identifications stored in a look-up table, the nefarious entity may not access the secure environment 26 to "set" one or more flags 27.

In an embodiment, access may be denied if a nefarious entity provides one or more combinations of identifications.

For example, if an entity desires to access one or more data packages 25 in order to install an update to a data package 25, the entity may be queried to identify the action the entity and/or request purports to take, the amount of memory the action may occupy, as well as a security code. A nefarious entity may have stolen a valid security code as well as sent a false notification identifying that the nefarious entity wants to install an update with one or more data packages. However, the nefarious entity may not provide a memory space need which matches the memory space needed to install the update. In this case, the nefarious entity would be denied access because it did not provide the identification information which matches the information in, for example, a look-up table.

Figure 4:
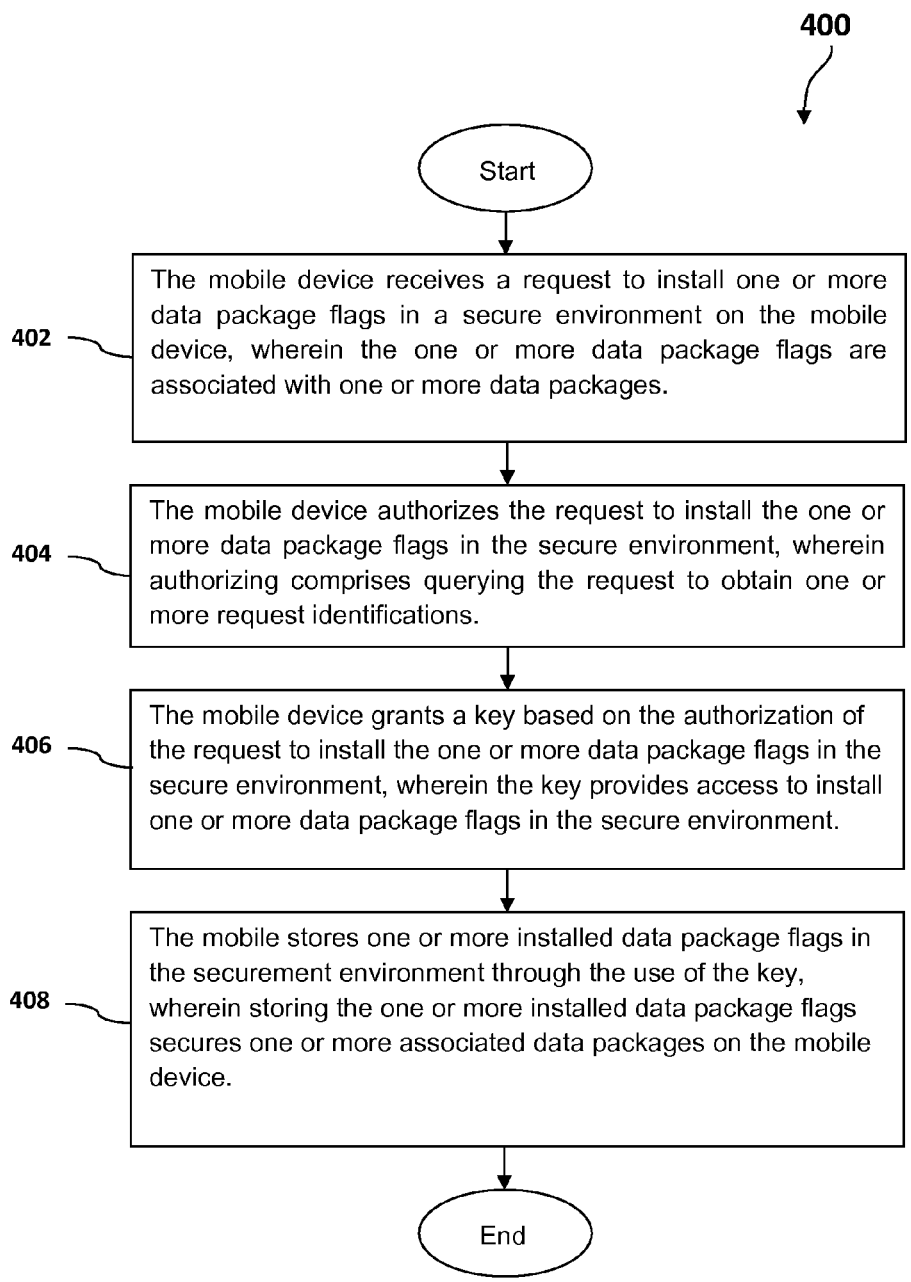
FIG. 4 is a flow chart of another method according to an embodiment of the disclosure.

Turning to FIG. 4, a method 400 is described. At block 402, a mobile device 12 and/or the access server 40 may receive a request to install one or more data package flags 27 in a secure environment 26 on the mobile device 12, wherein the one or more data package flags 27 are associated with one or more data packages 25. In an embodiment, the request may originate from server, data package source, and/or one or more data packages 25 that has been approved and/or has previously been authenticated by, for example, a network administrator. As previously disclosed, an approved and/or authenticated data package source and/or data package 25 may be given one or more request identifications to present to the access server 40 in order to obtain one or more key 48 to access to the secure environment.

At block 404, the mobile device 12 and/or the access server 40 authorizes the request to install the one or more data package flags 27 in the secure environment 26, wherein authorizing comprises querying the request to obtain one or more request identifications. For example, the mobile device 12 may query the originator of the request to provide a security code and data package identification of the data package 25 that the originator purports to install in the memory 24 of the mobile device 12. In an embodiment, authorizing may comprise examining the one or more request identifications with a look-up table which lists authorized data package source(s) and/or authorized data package(s). For example, a data package source may have been authorized by a network administrator to install one or more data package flags 27 in the secure environment 26 of the mobile device 12. The network administrator may create a login account associated with a data package source. The login account may comprise request identifications. The network administrator may have provided the request identifications to the data package source so that when the data package source sends a request to the mobile device 12 and/or the access server 40 to install one or more data package flags 27 on the mobile device 12, the data package source may provide one or more request identifications in response to a query for one or more request identifications. The mobile device 12 and/or the access server 40 may match the request identifications with login accounts stored in a memory such as memory 44 of the access server 40 and/or the memory 24 of the mobile device 12. If a match is found between the request identification and the login accounts, the data package source and/or one or more data packages 25 may be authorized so that one or more flags 27 associated with the data package source and/or the one or more data packages 25 may be installed on the secure environment 26 of the mobile device 12.

At block 406, the mobile device 12 and/or the access server 40 grants a key 48 based on the authorization of the request to install the one or more data package flags 27 in the secure environment 26, wherein the key 48 provides access to install one or more data package flags 27 in the secure environment 26. For example, if a match is found between the request identification(s) and the login accounts and the data package source and/or one or more data packages 25 may be authorized so that one or more flags 27 associated with the data package source and/or the one or more data packages 25 may be installed on the secure environment 26 of the mobile device 12. The access server 40 may be instructed based on the authorization, for example, by the mobile device 12 to grant one or more keys 48 so that one or more flags 27 associated with one or more data packages 25 may be stored in the secure environment 26. In an embodiment, the access server 40 may unilaterally grant one or more keys 48 so that one or more flags 27 associated with one or more data packages 25 may be stored in the secure environment 26. In an embodiment, the one or more keys 48 may be configured so that use of the one or more keys 48 may expire after a predetermined time and/or a predetermined number of attempts. In an embodiment, the access server 40 may transmit one or more signals configuring the secure environment 26 to permit access to the secure environment 26 with the one or more keys 48. The configuration signal may cause one or more keys 48 to expire after a predetermined period of time and/or a predetermined number of attempts.

At block 408, the mobile device 12 and/or the access server 40 stores one or more installed data package flags 27 in the securement environment 26 through the use of one or more keys 48, wherein storing the one or more installed data package flags 27 secures one or more associated data packages 25 on the mobile device 12. For example, after a data package source is granted one or more keys 48, the data package source may use the one or more keys 48 to access the secure environment 26. The secure environment 26 is configured so that entities outside the secure environment 26 and/or entities not authorized (e.g. an entity denied one or more keys 48) to access the secure environment 26 may not view content stored in the secure environment 26, manipulate content stored in the secure environment 26, modify content stored in the secure environment 26, delete content stored in the secure environment 26, execute content stored in the secure environment 26, and/or the like. Additionally, the flags 27 may be "set" and "unset" to enable to the viewing, manipulation, modification, deletion, execution, and/or the like of data packages 25 associated with one or more flags 27. Thus, by securing the one or more flags 27 in the secure environment 27 authorized sources may not access one or more data packages 25 and/or one or more persona comprising one or more data packages 25 stored on the mobile device 12.

Figure 5:
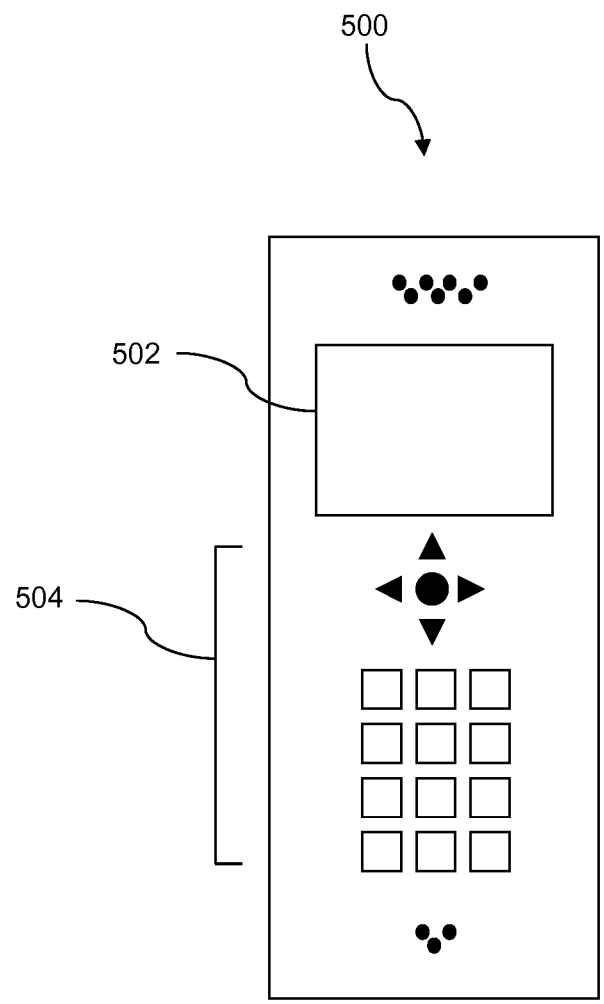
FIG. 5 is an illustration of a mobile phone according to an embodiment of the disclosure.

FIG. 5 depicts the mobile device 500, which is operable for implementing aspects of the present disclosure, but the present disclosure should not be limited to these implementations. The mobile device 500 may be implemented in a form substantially similar to that of the mobile device 500 described below. Though illustrated as a mobile phone, the mobile device 500 may take various forms including a wireless handset, a pager, a personal digital assistant (PDA), a gaming device, or a media player. The mobile device 500 includes a display 502 and a touch-sensitive surface and/or keys 504 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 502 to show a web page. The web page may be obtained via wireless communications with a base transceiver station, a wireless network access node, a peer mobile device 500 or any other wireless communication network or system.

Figure 6:
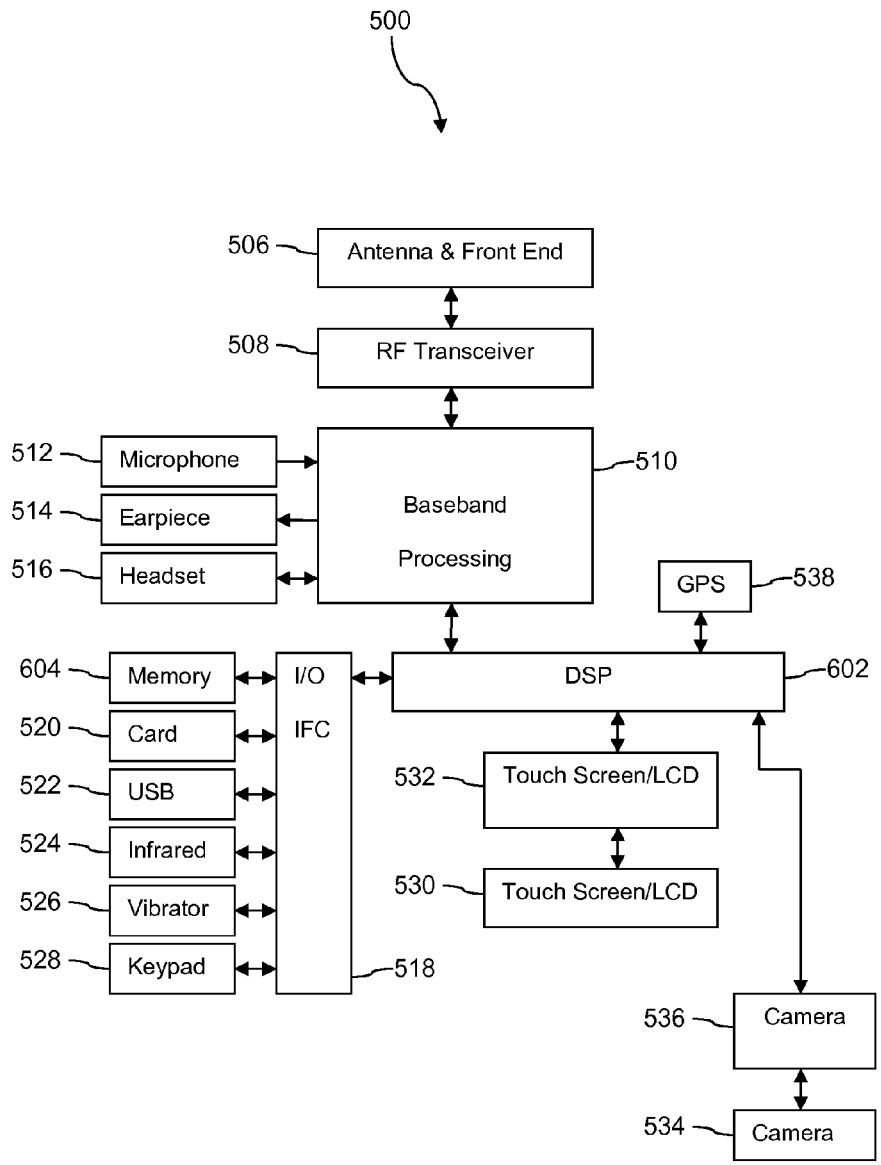
FIG. 6 is a block diagram of a mobile phone according to an embodiment of the disclosure.

FIG. 6 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 602 and a memory 604. As shown, the mobile device 500 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 500 may include another kind of display that does not provide a touch sensitive screen. In an embodiment, the DSP 602 may communicate directly with the memory 604 without passing through the input/output interface 518. Additionally, in an embodiment, the mobile device 500 may comprise other peripheral devices that provide other functionality.

The DSP 602 or some other form of controller or central processing unit operates to control the various components of the mobile device 500 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 520 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 602 and various memories and interfaces. The memory 604 and the removable memory card 520 may provide software and data to configure the operation of the DSP 602. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth® interface or an IEEE 802.11 compliant wireless interface may enable the mobile device 500 to communicate wirelessly with other nearby handsets and/or wireless base stations.

The keypad 528 couples to the DSP 602 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 602 to the touch screen LCD 530. The GPS receiver 538 is coupled to the DSP 602 to decode global positioning system signals, thereby enabling the mobile device 500 to determine its position.

Figure 7A:
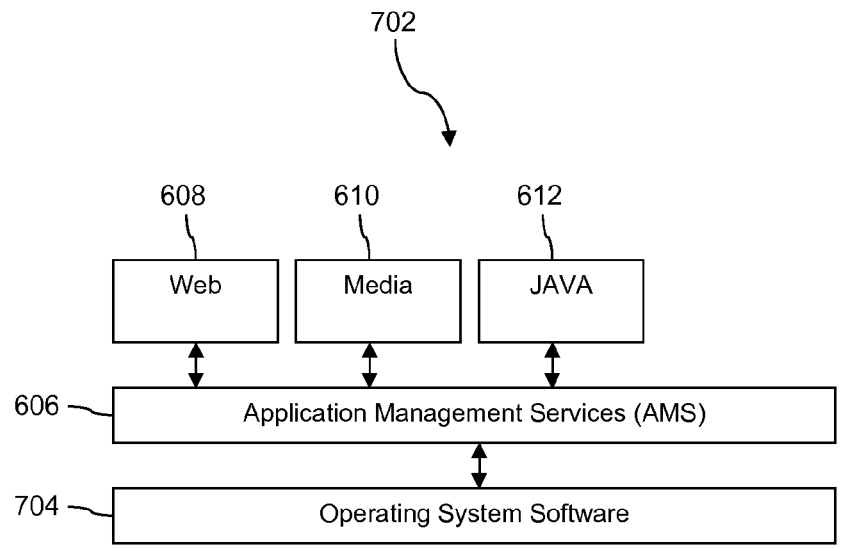
FIG. 7A is an illustration of a software architecture for a mobile phone according to an embodiment of the disclosure.

FIG. 7A illustrates a software environment 702 that may be implemented by the DSP 602. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 606 that transfer control between applications running on the mobile device 500. Also shown in FIG. 7A are a web browser application 608, a media player application 610, and JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 7B:
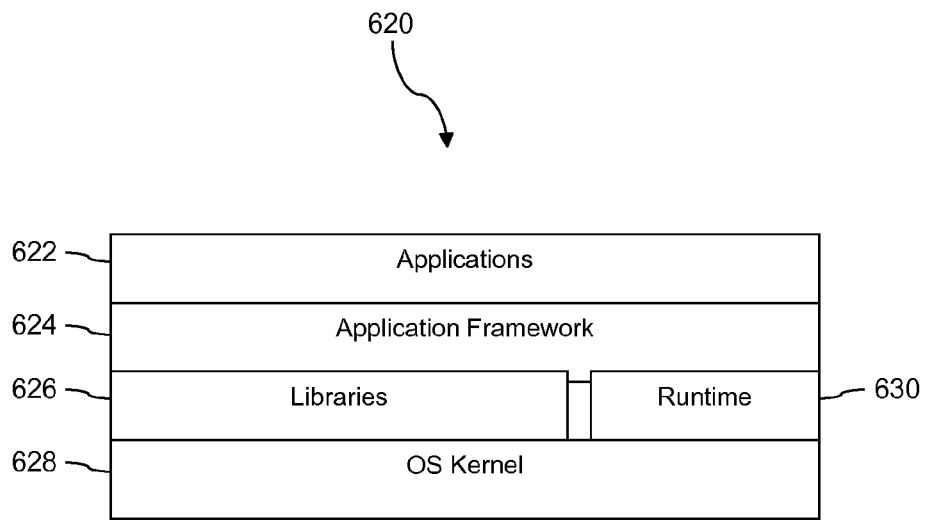
FIG. 7B is an illustration of another software architecture for a mobile phone according to an embodiment of the disclosure.

FIG. 7B illustrates an alternative software environment 620 that may be implemented by the DSP 602. The DSP 602 executes operating system software 628 and an execution runtime 630. The DSP 602 executes applications 622 that may execute in the execution runtime 630 and may rely upon services provided by the application framework 624. Applications 622 and the application framework 624 may rely upon functionality provided via the libraries 626.

Figure 8:
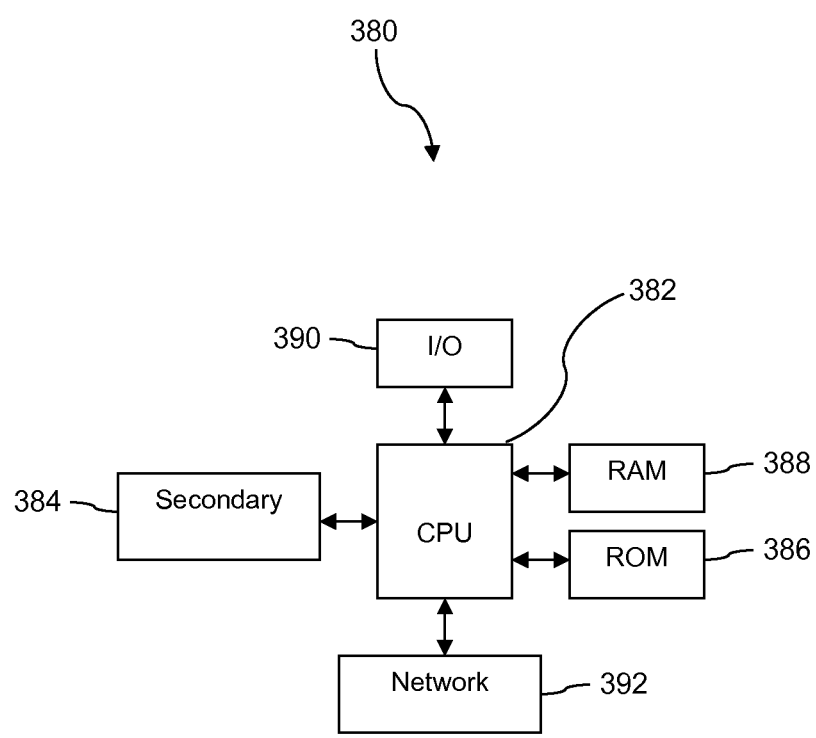
FIG. 8 is an illustration of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of accessing secure data on a mobile device, comprising:
   receiving, by the mobile device, a request to access a data package stored on the mobile device;
   authorizing, by the mobile device, the request to access the data package, wherein authorizing comprises querying the request to obtain one or more request identifications;
   granting, by the mobile device, at least one key in response to authorizing the request, wherein the at least one key provides access to a secure environment on the mobile device storing one or more flags associated with the data package, wherein the secure environment prevents unauthorized access to the one or more flags, and wherein the secure environment comprises a trusted security zone that includes one or more chipsets with a hardware root of trust, a secure execution environment for applications, and secure access to peripherals, or a secure element that includes a secure operating environment comprising a microprocessor, memory, and operating system;
   granting, by the mobile device, access to the secure environment, wherein access is granted to the secure environment in response to presenting the at least one key to the secure environment; and
   granting, by the mobile device, access to the data package, wherein granting access to the data package comprises changing a setting of the one or more flags associated with the data package.

2. The method of claim 1, wherein the data package is stored in the secure environment.

3. The method of claim 1, wherein the request identifications comprise the source of the request, an action the request purports to take, one or more data packages the request purports to access, the IP address of the mobile device sought by the request, and one or more security codes.

4. The method of claim 1, wherein authorizing further comprises verifying based on one or more request identifications that the request to access the secure environment is an approved request.

5. The method of claim 1, wherein the data package comprises at least a mobile device management application, at least an application managed by a mobile device management application, or at least one or more persona.

6. The method of claim 1, wherein access to the one or more data packages comprises at least one of viewing content associated with the data package, manipulating content associated with the data package, modifying a data package, deleting a data package, and executing a data package.

7. The method of claim 1, wherein the data package is affiliated with a persona.

8. A method of securing data on a mobile device, comprising:
   enabling, by the mobile device, a user to secure one or more data packages from wireless access, wherein securing one or more data packages from wireless access comprises changing a setting of one or more data package flags associated with the one or more data packages using a mobile device interface, wherein at least the one or more data package flags are stored in a secure environment on the mobile device and the secure environment prevents unauthorized access to the one or more data package flags, and wherein the secure environment comprises a trusted security zone that includes one or more chipsets with a hardware root of trust, a secure execution environment for applications, and secure access to peripherals, or a secure element that includes a secure operating environment comprising a microprocessor, memory, and operating system;
   receiving, by the mobile device, a wireless request to access the one or more data packages;
   querying, by the mobile device, the wireless request to access the one or more data packages, wherein querying comprises requesting one or more wireless request identifications;
   denying, by the mobile device, access to the one or more data packages based on querying the wireless request to access the one or more data packages, wherein denying access to the one or more data packages comprises denying access to the secure environment storing at least the one or more data package flags.

9. The method of claim 8, further comprising displaying on the mobile device interface a list of the one or more data packages which may be secured by a mobile device user through the mobile device interface.

10. The method of claim 8, wherein denying access to the one or more data packages further comprises denying access to a key, wherein the key grants access to the secure environment.

11. The method of claim 8, wherein the wireless request identifications comprise the source of the request, an action the request purports to take, one or more data packages the request purports to access, the IP address of the mobile device sought by the request, and one or more security codes.

12. The method of claim 8, wherein querying further comprises verifying based on one or more request identifications that the request to access the secure environment is not an approved request.

13. The method of claim 8, wherein the one or more data packages comprise at least one or more mobile device management applications, at least one or more applications managed by the one or more mobile device management application, or at least one or more persona.

14. The method of claim 8, wherein denying access to the one or more data packages comprises at least one of preventing the viewing of content associated with the one or more data packages, preventing the manipulating of content associated with the one or more data packages, preventing the modifying of one or more data packages, preventing the deleting of one or more data packages, and preventing the executing of one or more data packages.

15. A method of installing secure data on a mobile device, comprising:
 receiving, by the mobile device, a request to install one or more data package flags in a secure environment on the mobile device, wherein the one or more data package flags are associated with one or more data packages, wherein the secure environment prevents unauthorized access to the one or more flags, and wherein the secure environment comprises a trusted security zone that includes one or more chipsets with a hardware root of trust, a secure execution environment for applications, and secure access to peripherals, or a secure element that includes a secure operating environment comprising a microprocessor, memory, and operating system;
 authorizing, by the mobile device, the request to install the one or more data package flags in the secure environment, wherein authorizing comprises querying the request to obtain one or more request identifications;
 granting, by the mobile device, a key based on the authorization of the request to install the one or more data package flags in the secure environment, wherein the key provides access to install one or more data package flags in the secure environment; and
 installing, by the mobile device, the one or more data package flags in the secure environment through the use of the key, wherein installing the one or more data package flags secures one or more associated data packages on the mobile device.

16. The method of claim 15, further comprising receiving a request to install one or more data packages in the memory of the mobile device.

17. The method of claim 15, further comprising receiving a request to install one or more data packages in the secure environment and storing one or more installed data packages in the secure environment.

18. The method of claim 15, wherein the request identifications comprise the source of the request, an action the request purports to take, one or more data packages the request purports to access, the IP address of the mobile device sought by the request, and one or more security codes.

19. The method of claim 15, wherein authorizing comprises verifying based on one or more request identifications that the request to access the secure environment is an approved request.

20. The method of claim 15, wherein the key expires after a predetermined period of time or a predetermined number of access attempts.

\* \* \* \* \*